W. R. PARR.
Pendulum-Scales.
No. 146,944. Patented Jan. 27, 1874.
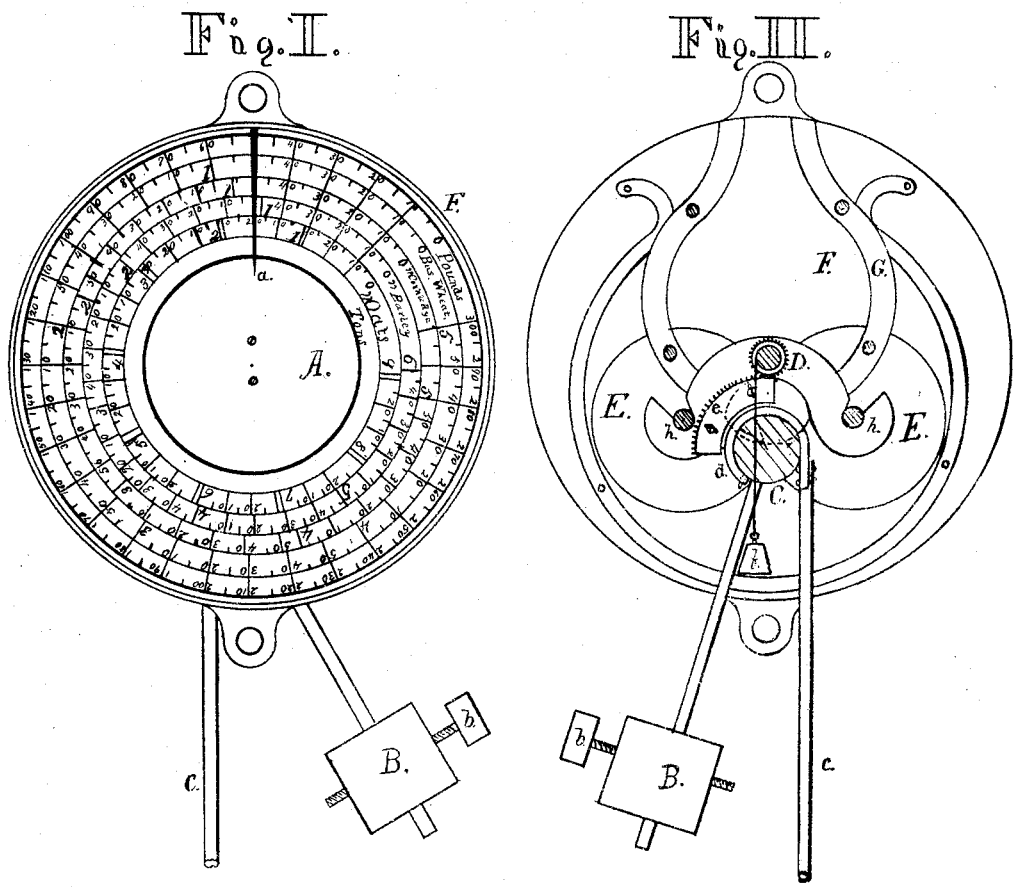

UNITED STATES PATENT OFFICE.

WILLIAM R. PARR, OF ELBA, MINNESOTA.

IMPROVEMENT IN PENDULUM-SCALES.

Specification forming part of Letters Patent No. 146,944, dated January 27, 1874; application filed July 24, 1873.

*To all whom it may concern:*

Be it known that I, WILLIAM R. PARR, of Elba, in the county of Winona and State of Minnesota, have invented certain new and useful Improvements in Mill, Platform, and other Scales; and I do hereby declare that the following is a full, clear, and exact description thereof, that will enable others skilled in the art to which it appertains to make and use the same, reference being had to the accompanying drawings and to the letters of reference marked thereon, which form a part of this specification.

My invention has relation to mill, platform, and other scales, constructed to operate a pointer or dial without springs, and, at the same time, to be a perfect indicator, always showing at a glance the weight of articles being weighed, and, by different sets of figures on the dial, showing at the same time the number of bushels and pounds of grain of different denominations.

In the drawing, Figure 1 represents a front view of my improved scale. Fig. 2 represents a reverse sectional view of the same, showing the working parts.

A represents the revolving dial, upon which are circles of figures, laid off to represent pounds, bushels, tons, &c.; the outside circle representing pounds; the next inside circle representing bushels of wheat and cloverseed, which is sixty pounds; the next inside circle representing bushels of corn and rye, of fifty-six pounds; the next one barley, of forty-eight pounds; and the next one oats, of thirty-two pounds to the bushel. The next or inside circle—not laid off—may be laid off for tons or any other denomination desired; and as many other circles may be added as may be desired for any purpose.

This dial A is fast to, and revolves with, the shaft D, Fig. 2, which shaft rests and revolves upon the friction-wheels, two of which are shown at E E. The other two, being exactly similar, are not shown, but are on the same shafts $h\ h$, the two being removed in the drawing to show the working parts of the device. These shafts $h\ h$ are held to place by the frame G, which also serves to hold the casing F in place, in which the dial A is protected, and to which the pointer $a$ is attached.

The dial may be made stationary, and the pointer revolve with the shaft D, and the same results will follow.

The rod $c$ (shown as broken off) is the rod to which the platform is attached in the ordinary manner, and serves, by its connection, to operate the dial A. The frame G supports the cylinder by means of its knife-edges, one of which is represented by dotted lines on the cross-section of the cylinder C. This cylinder has one such knife-edge at each of its ends, which are so constructed as to make the turning point or knife-edge come at its center, and upon which the cylinder rocks. Upon this cylinder, and nearly around it, is placed a chain or band, $d$, which is fast to the cylinder at one of its ends, and its other end is made fast to the rod $c$. B is a weight, which is adjustable upon a rigid arm fast to, and reaching out from, the cylinder C. Upon one side of this cylinder is also placed the segment of gear $e$, which engages with a pinion on the dial-shaft D. Upon the dial-shaft D is wound a small cord, to which is attached a small weight, $f$, which serves to counterbalance the friction of the dial-shaft D.

The mode of operation is as follows: Place the article to be weighed upon the platform. This will cause the rod $c$ to pull upon the band $d$, which will cause the cylinder C to revolve and raise the weight B toward a horizontal position, and, as it will require increased force to balance it as it approaches the horizontal, the weight B will rise until it balances the articles on the platform. By this motion of the cylinder C the dial A will revolve by means of the small weight $f$ and segment-gear $e$ and pinion on shaft D.

To balance the scale when nothing is on the platform, a small weight, $b$, is provided, fast to one end of a screw which passes through a nut in the weight B, by which means the weight B is brought to a perpendicular position.

The dial in the drawing is represented as weighing the amount of fifty pounds, as shown by the outside circle of figures; or, in the circle for barley, it shows one bushel and eighteen pounds.

Should it be weighted to two hundred and seventy pounds, for instance, it would show, in the circle for wheat, four bushels and thirty pounds of wheat; and, of corn and rye, four bushels and forty-six pounds; or, of barley, five bushels and thirty pounds; and of oats there would be eight bushels and fourteen pounds, the pointer $a$ showing all at once, as the amount is brought to it by the weight of grain on the platform.

Having thus described my invention, what I claim, and desire to secure by Letters Patent, is—

In a platform or other scale, the revolving or stationary dial A, pointer $a$, dial or pointer shaft D, and weight-cord and weight $f$, in combination with the cylinder C, chain or its equivalent $d$, friction-wheels E E, segment-gear $c$, and weight B, with its balance-weight and screw $b$, substantially as and for the purpose hereinbefore set forth.

In testimony that I claim the foregoing I have hereunto set my hand this 15th day of July, 1873.

WILLIAM R. PARR.

Witnesses:
R. R. BRIGGS,
HENRY STEVENS.